US009009368B2

(12) United States Patent
White

(10) Patent No.: US 9,009,368 B2
(45) Date of Patent: Apr. 14, 2015

(54) INTERRUPT LATENCY PERFORMANCE COUNTERS

(71) Applicant: Advanced Micro Devices, Inc., Sunnyvale, CA (US)

(72) Inventor: Sean T. White, Westborough, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 10 days.

(21) Appl. No.: 13/658,027

(22) Filed: Oct. 23, 2012

(65) Prior Publication Data

US 2014/0115198 A1 Apr. 24, 2014

(51) Int. Cl.
*G06F 11/34* (2006.01)
*G06F 13/26* (2006.01)
*G06F 13/34* (2006.01)

(52) U.S. Cl.
CPC ............... *G06F 13/26* (2013.01); *G06F 13/34* (2013.01)

(58) Field of Classification Search
CPC ................................ G06F 13/26; G06F 13/34
See application file for complete search history.

(56) References Cited

U.S. PATENT DOCUMENTS

| | | | |
|---|---|---|---|
| 5,222,215 A | 6/1993 | Chou et al. | |
| 5,291,605 A | 3/1994 | Takagi et al. | |
| 5,361,375 A | 11/1994 | Ogi | |
| 5,371,857 A | 12/1994 | Takagi | |
| 5,892,957 A | 4/1999 | Normoyle et al. | |
| 5,944,840 A * | 8/1999 | Lever | 714/34 |
| 6,332,169 B1 | 12/2001 | Hagersten | |
| 6,622,193 B1 | 9/2003 | Avery | |
| 6,977,908 B2 | 12/2005 | de Azevedo et al. | |
| 7,000,051 B2 | 2/2006 | Armstrong et al. | |
| 7,054,975 B2 | 5/2006 | Tjia | |
| 7,130,949 B2 | 10/2006 | Belmar et al. | |
| 7,209,994 B1 | 4/2007 | Klaiber et al. | |
| 7,222,203 B2 | 5/2007 | Madukkarumukumana et al. | |
| 7,281,075 B2 | 10/2007 | Armstrong et al. | |
| 7,380,041 B2 | 5/2008 | Belmar et al. | |
| 7,383,374 B2 | 6/2008 | Yamada et al. | |
| 7,546,406 B2 | 6/2009 | Armstrong et al. | |
| 7,552,236 B2 | 6/2009 | Greenfield et al. | |
| 7,603,504 B2 * | 10/2009 | Pudipeddi et al. | 710/261 |
| 7,689,747 B2 | 3/2010 | Vega et al. | |
| 7,707,341 B1 | 4/2010 | Klaiber et al. | |

(Continued)

OTHER PUBLICATIONS

VMware Inc. Timekeeping in VMware Virtual Machines. Information Guide. 2010.

(Continued)

*Primary Examiner* — Henry Tsai
*Assistant Examiner* — John Roche
(74) *Attorney, Agent, or Firm* — Rory D. Rankin; Meyertons, Hood, Kivlin, Kowert & Goetzel, P.C.

(57) ABSTRACT

A system and method for finding the sources of increased interrupt latencies. An interrupt controller includes monitoring logic for measuring and storing latencies for servicing interrupt requests. The interrupt controller determines a measured latency is greater than an associated threshold and in response sends an indication of a long latency. The interrupt controller may send the indication to firmware, a device driver, or other software. The interrupt controller stores associated information with the measured latency for debug purposes. Additionally, the monitoring logic may perform statistical analysis in place of, or in addition to, software.

18 Claims, 4 Drawing Sheets

(56) References Cited

U.S. PATENT DOCUMENTS

| | | |
|---|---|---|
| 7,730,250 B2 | 6/2010 | Nanmoto |
| 7,809,875 B2 | 10/2010 | Sundaram et al. |
| 7,849,247 B2 | 12/2010 | Marietta et al. |
| 7,873,770 B2 | 1/2011 | Hummel et al. |
| 7,917,740 B1 | 3/2011 | Klaiber et al. |
| 7,945,905 B2 | 5/2011 | Kumar et al. |
| 8,055,827 B2 | 11/2011 | Serebrin et al. |
| 8,180,944 B2 | 5/2012 | Serebrin et al. |
| 8,234,432 B2 | 7/2012 | Serebrin |
| 8,489,789 B2 | 7/2013 | Serebrin et al. |
| 8,612,660 B2 * | 12/2013 | Koning et al. ............ 710/262 |
| 2004/0117532 A1 | 6/2004 | Bennett et al. |
| 2004/0205272 A1 | 10/2004 | Armstrong et al. |
| 2004/0215860 A1 | 10/2004 | Armstrong et al. |
| 2005/0125580 A1 | 6/2005 | Madukkarumukumana et al. |
| 2005/0228921 A1 | 10/2005 | Sethi et al. |
| 2006/0075146 A1 | 4/2006 | Schoinas et al. |
| 2006/0112212 A1 | 5/2006 | Hildner |
| 2008/0015712 A1 | 1/2008 | Armstrong et al. |
| 2008/0114916 A1 | 5/2008 | Hummel |
| 2008/0126618 A1 * | 5/2008 | Pardo ............................ 710/48 |
| 2008/0162762 A1 | 7/2008 | Neiger et al. |
| 2010/0023666 A1 | 1/2010 | Mansell et al. |
| 2010/0223611 A1 | 9/2010 | Mahalingam et al. |
| 2011/0107328 A1 | 5/2011 | Serebrin et al. |
| 2011/0197004 A1 | 8/2011 | Serebrin et al. |
| 2011/0219157 A1 | 9/2011 | Yamaguchi et al. |

OTHER PUBLICATIONS

Advanced Micro Devices. AMD64 Virtualization Codenamed "Pacifica" Technology. Reference Manual. May 2005.

Adams et al. A Comparison of Software and Hardware Techniques for x86 Virtualization. ACM. 2006.

Dong et al. Towards High-Quality I/O Virtualization. SYSTOR. May 2009.

Office Action from U.S. Appl. No. 12/611,595, mailed Dec. 17, 2010, 11 pages.

Office Action from U.S. Appl. No. 12/611,595, mailed May 27, 2011, Benjamin C. Serebrin, 7 pages.

International Search Report from PCT/US2010/022111 mailed Jun. 9, 2010, 13 pages.

"Advanced Programmable Interrupt Controller (APIC)," Chapter 9, vol. 3, Sep. 2008, 68 pages.

Office Action from U.S. Appl. No. 12/611,607, mailed Sep. 27, 2011, Benjamin C. Serebrin, 10 pages.

Office Action from U.S. Appl. No. 12/611,622, mailed Dec. 16, 2011, Benjamin C. Serebrin, 9 pages.

* cited by examiner

INTERRUPT LATENCY PERFORMANCE COUNTERS

BACKGROUND

1. Field of the Invention

This invention relates to computing systems, and more particularly, to finding the sources of increased interrupt latencies, which create performance loss.

2. Description of the Relevant Art

As both semiconductor manufacturing processes advance and on-die geometric dimensions reduce, semiconductor chips provide more functionality and performance. Medical, business, education, engineering and entertainment applications increasingly use audio and video content, which demand greater performance from the semiconductor chips. Such applications may be categorized as multimedia applications which include a combination of any or all of text, audio, still images, animation, video, and user-interactivity content. Multimedia functionality and content increase the importance of efficient data transfer both into and out of a computing system, whether the computing system is a desktop computer, laptop computer, smart phone, portable media player, or otherwise.

In some cases, design issues arise that may limit the potential benefits provided by advanced semiconductor chips. One such issue is input/output (I/O) subsystems may reduce overall system performance if data transfer is inefficient. Additionally, inefficient interrupt handling performed within the I/O subsystem may severely impact performance. Interrupt handling may be used to service a variety of asynchronous events. Typically, when an interrupt is asserted, a corresponding handler or subroutine causes the processor to temporarily suspend one or more processes and then begin executing the subroutine.

Delays associated with interrupts include at least the time taken to detect an interrupt has been asserted, the time it takes to initiate execution of an interrupt service subroutine, and the time it takes for execution of the interrupt service subroutine to complete. One or more of these delays or sums of delays may be sufficiently large to prevent the processor from properly maintaining acceptable performance of the processes. For example, particular multimedia entertainment applications may experience adverse effects of real-time processes resulting in image flickering or freezes and audio popping or delayed playback. Another example may include medical equipment monitoring a patient and providing delayed readings or failing altogether. Further, a communication link may lose data being transmitted.

To find and observe design issues related to appreciable interrupt latencies is difficult. The conditions causing the latency may be difficult to reproduce and accurately measuring the interrupt latency in real-time may also be difficult. In some cases, a logic analyzer may be used to measure interrupt latencies and determine related design issues. However, a logic analyzer uses external links to connect to a computing system being tested and may not provide an accurate representation of the conditions as they exists during normal system operation. Further, the investigative process may be cumbersome and consume many hours.

In view of the above, efficient methods and systems for finding the sources of increased interrupt latencies, which create performance loss, are desired.

SUMMARY OF EMBODIMENTS

Systems and methods for finding the sources of increased interrupt latencies which create performance loss are contemplated. In one embodiment, an interrupt controller may be included in at least a processing node, an input/output (I/O) controller hub, and a chipset. The interrupt controller includes control logic and registers for storing and prioritizing received interrupt requests. In various embodiments, the interrupt controller includes monitoring logic for measuring a latency for servicing a given interrupt request. In some embodiments, the interrupt latency is measured between a first point-in-time at which the interrupt is issued and the time at which an indication is sent to begin a corresponding interrupt service routine. Also monitored may be a second point-in-time when the interrupt is cleared by the interrupt service routine. The monitoring logic may include a timer or counter for determining the interrupt latency. In some embodiments, a threshold is stored in a register for comparing to the measured latency. In other embodiments, software may read the timer value and performs the comparison with the threshold.

In some embodiments, the interrupt controller determines a measured latency is greater than an associated threshold and in response sends an indication of a long latency. The interrupt controller may, for example, send the indication to firmware, a device driver, or other software. Alternatively, the interrupt controller may send the indication to hardware control logic. In various embodiments, the monitoring logic stores associated information with the measured latency for analysis or debug purposes. The information may include an interrupt type, an identifier of a source of the received interrupt, and identifiers of other interrupts currently being serviced. Additionally, the monitoring logic may perform statistical analysis in place of software performing it. For example, the monitoring logic may compute and store maximum/minimum latencies, interrupt types of the maximum/minimum latencies, and a number of interrupts exceeding associated thresholds.

These and other embodiments will be further appreciated upon reference to the following description and drawings.

Figure 1:
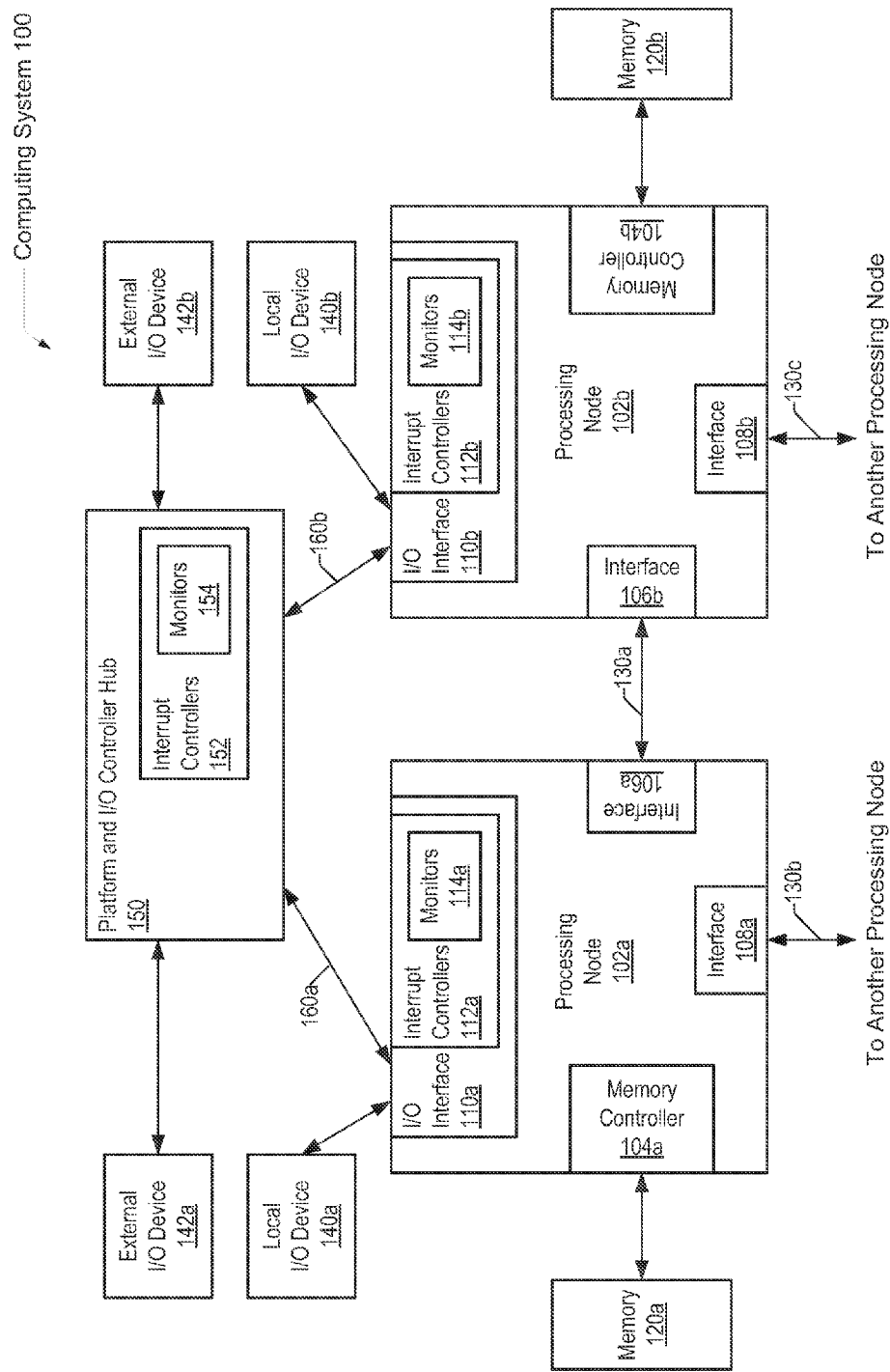
FIG. 1 is a generalized block diagram of one embodiment of a computing system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Turning to FIG. 1, a generalized block diagram of one embodiment of a computing system 100 is shown. Computing system 100 includes processing nodes 102a-102b. Although two nodes are shown in FIG. 1, other embodiments may include a different number of processing nodes, wherein each processing node includes one or more general-purpose processor cores. The general-purpose processor cores may execute instructions according to a given general-purpose instruction set. For example, the x86® instruction set architecture (ISA) may be selected. Alternatively, the x86-64®, Alpha®, PowerPC®, MIPS®, SPARC®, PA-RISC®, or any other instruction set architecture may be selected.

Alternatively, each one of the processing nodes 102a-102b may include a processor with heterogeneous cores, such as one or more general-purpose cores and one or more application specific cores. The application specific cores may include an application specific integrated circuit (ASIC), a graphics processing unit (GPU), a field programmable array (FPGA), a digital signal processor (DSP), and so forth.

Each one of the processing nodes 102a-102b may include an associated cache memory subsystem for at least one core. The cache memory subsystem may include multiple levels arranged in a hierarchy. The caches may store blocks of data. The caches may be integrated within respective processor cores. In addition, one or more levels may be located outside a processor core including a highest level being a shared cache memory subsystem shared among two or more processor cores.

Each one of the processing nodes 102a-102b may include interface logic for communicating with another processing node. For example, the processing node 102a includes interface logic 106a for communicating with the processing node 102b. In addition, the processing node 102a includes interface logic 108a for communicating with another processing node not shown. Similarly, the processing node 102b includes interface logic 106b for communicating with the processing node 102a. In addition, the processing node 102b includes interface logic 108b for communicating with another processing node not shown.

Computing system 100 may use one or more packet-based coherence links for inter-node communication. The coherence links may be used by a given processing node to at least access dedicated memory of another one of the processing nodes. In the embodiment shown, the nodes 102a-102b use coherence links 130a-130c for inter-node communication. Although a single link is shown connected to each one of the interfaces 106a-106b and 108a-108b, other embodiments may include a different number of links. The interconnect technology used in links 130a-130c may replace front-side bus communication. In some embodiments, the links 130a-130c include a bidirectional serial/parallel high-bandwidth, low-latency point-to-point communication with a cache coherency extension. Examples of the technology include coherent HyperTransport™ by AMD and QuickPath™ links by Intel. In other embodiments, the links 130a-130c may be unidirectional, but still support a cache coherency extension.

Each one of the processing nodes 102a-102b may be connected to a respective one of the memories 120a-120b. The memories 120a-120b may include one or more dynamic random access memories (DRAMs) of one or more types. The processing node 102a may use the memory controller 104a to connect to the memory 120a and the processing node 102b may use the memory controller 104b to connect to the memory 120a. The memory controllers may include request queues for queuing memory requests. A coherency point for an address within the computing system 100 may be a respective memory controller within the nodes 102a-102b connected to the memory storing bytes corresponding to the address.

The processing nodes 102a-102b may include the input/output (I/O) interfaces 110a-110b for communicating with one or more local I/O devices 140a-140b and the platform and I/O controller hub 150. The local I/O devices 140a-140b may include video graphics, audio, network connection cards, and other computer peripheral devices. The I/O interfaces 110a-110b may use the links 160a-160b to communicate with the platform and I/O controller hub 150. In some embodiments, the links 160a-160b may utilize a unified media interface (UMI) for communication between the I/O interfaces 110a-110b and the platform and I/O controller hub 150.

The platform and I/O controller hub 150, or simply hub 150, may perform I/O functions and communicate with external I/O devices 142a-142b and software such as peripherals following the Universal Serial Bus (USB) protocol, peripherals and network cards following the Peripheral Component Interconnect Express (PCIe) protocol, the system basic input/output software (BIOS) stored in a read only memory (ROM), interrupt controllers, Serial Advanced Technology Attachment (SATA) devices, network interfaces, a multi-channel high definition audio codec functionality and interface and so forth. The hub 150 may respond to control packets and messages received on respective links and generate control packets and response packets in response to information and commands received from the processing nodes 102a-102b. The hub 150 may perform on-die the operations typically performed off-die by a conventional southbridge chipset.

Interrupts are generally asynchronous requests to have a service routine performed. Software interrupts call a large number of BIOS routines. Sources of a hardware interrupt may be peripheral devices, such as local I/O devices 140a-140b and 142a-142b. A processor may perform the service routine(s). The interrupt service routine may also be referred to as an interrupt handler. Each of the I/O interfaces 110a-110b and the hub 150 may include interrupt controllers 112a-112b and interrupt controller 152, respectively. The interrupt controllers 112a-112b and 152 may be programmable controllers that allow interrupt priority levels to be changed.

When a given event occurs or particular conditions are satisfied, an interrupt signal is asserted. In response, an associated interrupt handler causes the processor to temporarily suspend the execution of each process that has a lower priority than the interrupt handler. The lower priority processes are suspended in a manner that allows them to be resumed after the interrupt handler completes. The processor executes the interrupt handler to perform steps associated with the interrupt. After the routines associated with the interrupt are completed, the processor resumes execution of the temporarily suspended processes.

One or more processes executing on the processor handling the interrupt service routine may have a higher priority than the received interrupt. These one or more processes may not be affected by the interrupt service routine. However, the performance of one or more applications may be affected by a long latency interrupt. For example, when software or hardware is added to a system, the processor may now execute a number of relatively higher priority interrupts. Additionally, particular data may be requested during execution of the interrupt service routine and the data may be delayed. Again, one or more applications may be affected by the unexpected delay.

Designers may be able to determine an estimated interrupt latency using an estimated number of clock cycles used during execution of a given interrupt service routine. An interrupt latency may be the time duration consumed during one or more of receiving and issuing the interrupt request, processing of an associated interrupt service routine, and indicating the interrupt is serviced. Ideal situations may be used for this estimation. However, actual additional delay may occur and the interrupt latency may significantly increase. In addition, the actual times that the interrupts occur may vary and be unpredictable relative to the execution of software applications. The performance of the software applications may significantly reduce. In addition, the functionality of the software applications may possibly fail, as the processor is unavailable for lower priority processes while servicing an interrupt, or when the functionality of the software applications is only guaranteed if a maximum interrupt latency is not exceeded. Therefore, in various embodiments, each of the interrupt controllers 112a-112b and 152 may include monitors 114a-114b and 154 for measuring interrupt latencies.

Locating the cause of inadvertent behavior in software applications due to logical errors is a feasible and relatively less arduous process than locating causes due to excessive delays in interrupt delivery. Distinguishing between the two causes may be also arduous. The monitors may measure actual interrupt latencies during program execution. In some embodiments, the interrupt latency is measured between a first point-in-time the interrupt is issued and an indication is sent to begin a corresponding interrupt service routine and a second point-in-time when the interrupt is cleared by the interrupt service routine. In other embodiments, a different start and end point-in-time may be used.

The monitoring logic may include a timer or counter for determining the interrupt latency. In some embodiments, a threshold is stored in a register for comparing to the timer value. In other embodiments, software reads the timer value and performs the comparison with the threshold. Further details are provided below.

Figure 2:
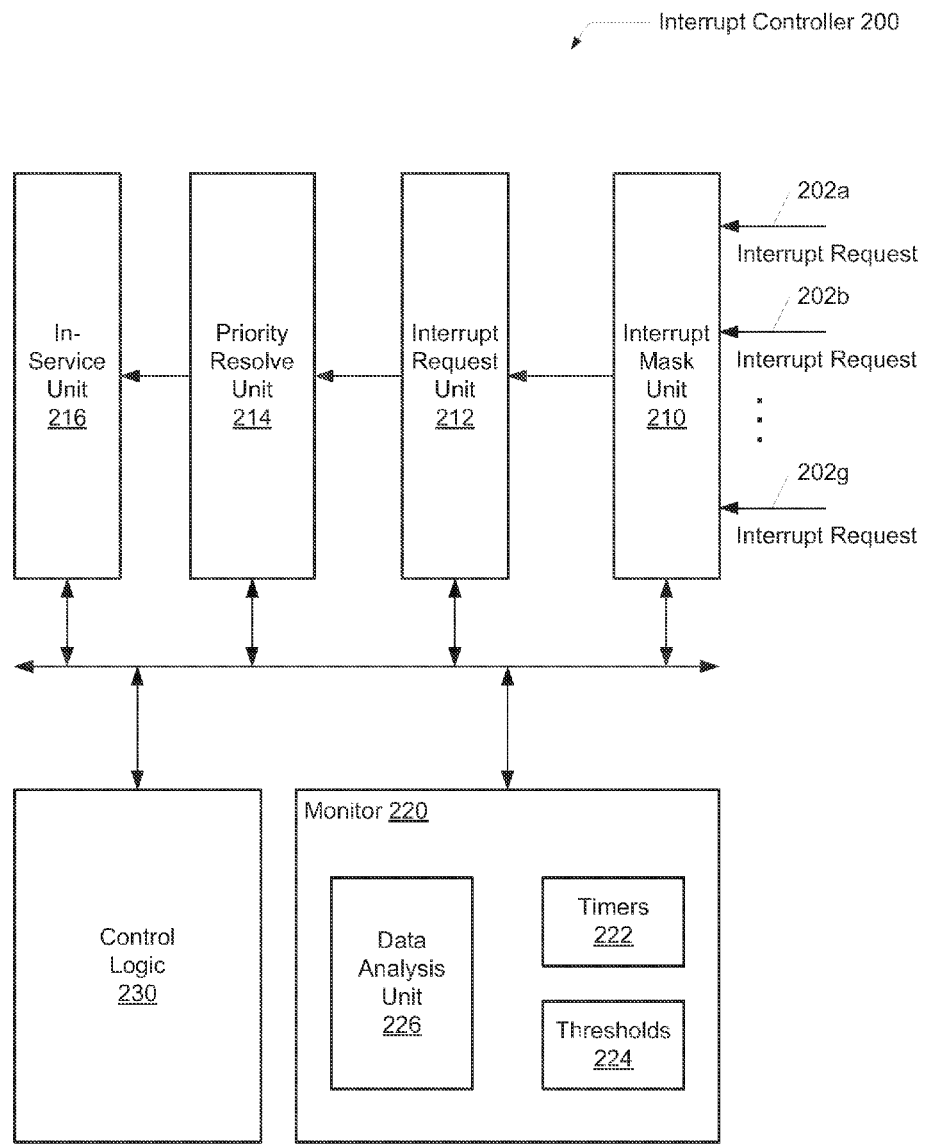
FIG. 2 is a generalized block diagram of one embodiment of an interrupt controller.

Referring now to FIG. 2, a generalized block diagram of one embodiment of an interrupt controller 200 is shown. As shown, the interrupt controller 200 includes an interrupt mask unit 210, an interrupt request unit 212, a priority resolve unit 214, and an in-service unit 216. In addition, control logic 230 is connected to the units 210-216 to synchronize tasks and a monitor 220 is used to measure interrupt latencies.

The interrupt mask unit 210 receives one or more interrupt requests 202a-202g. If a received interrupt request is masked, then the interrupt request may not be further processed. Otherwise, the interrupt request unit 212 may store the received interrupt request until the interrupt request is serviced. The interrupt resolve unit 214 may select one or more interrupt requests with a highest priority. One or more associated indications may be sent to a corresponding processor. An indication may be an asserted signal line. Alternatively, the indications may be packets sent across a link to a corresponding processor.

When the processor receives the indication of an interrupt, the processor may call an associated interrupt service routine. The processor may complete one or more instructions in-flight, suspend the lower priority processes being executed, and send an indication of having received the interrupt indication. For example, the processor may send an interrupt acknowledgement indication in the form of a pulse or asserted signal. In response to receiving the acknowledgment, the associated interrupt request is stored in the in-service unit 216. This interrupt request may have an associated entry invalidated or another stored metadata value updated to indicate the interrupt request is not requesting service, as it is currently being serviced.

When the associated interrupt service routine has completed, the routine may send an indication of completion to the in-service unit 216. In response, the interrupt request corresponding to the completed routine may have an associated entry invalidated or another stored metadata value updated to indicate the interrupt request is no longer in service.

In various embodiments, the monitor 220 includes one or more timers 222, one or more stored threshold values 224, and data analysis unit 226. A start time for beginning to measure interrupt latency may occur when an interrupt request is received. Alternatively, the start time may occur when an associated interrupt indication is sent to a corresponding processor. In still other implementations, the start time may occur when an acknowledgment is received from the processor. A stop time for ending measurement of the interrupt latency may occur when a completion indication is received from an associated interrupt service routine.

In some embodiments, software may read the measured latencies stored in the monitor 220. In other embodiments, the monitor 220 compares the latencies to an associated threshold in the stored threshold values 224. The monitor 220 may wait until the measurement of the interrupt latency is completed before performing comparisons. Alternatively, the monitor 220 may determine whether an interrupt latency being measured exceeds a corresponding threshold before the measurement is completed.

In response to determining an interrupt latency being measured already exceeds an associated threshold, the monitor may send an indication of the excessive interrupt latency. The indication may be sent to software or other hardware control logic. In some embodiments, this indication being sent also triggers the start of execution of a separate subroutine from the interrupt service routine. The separate subroutine may take steps to aid the interrupt service routine and reduce a time to service the interrupt request.

The data analysis unit 226 may store measured latency and associated information to be read by software or debug hardware logic. In some embodiments, the latencies remain in the timers or counters until they are read. In other embodiments, the latencies are transferred to a table or register for storage. The software may include the interrupt service routine, debug software, performance measurement software, a device driver associated with an I/O device that initiated the interrupt, and so forth. The measured latencies may be stored separately and analyzed or accumulated over time. In addition, the data analysis unit 226 may perform statistical analysis on the measured interrupt latencies and also store the computed information. Further, the monitor 220 may send the information to a given location in memory for reading by software or debug hardware logic. For example, the data may be sent to a trace capture buffer.

Figure 3:
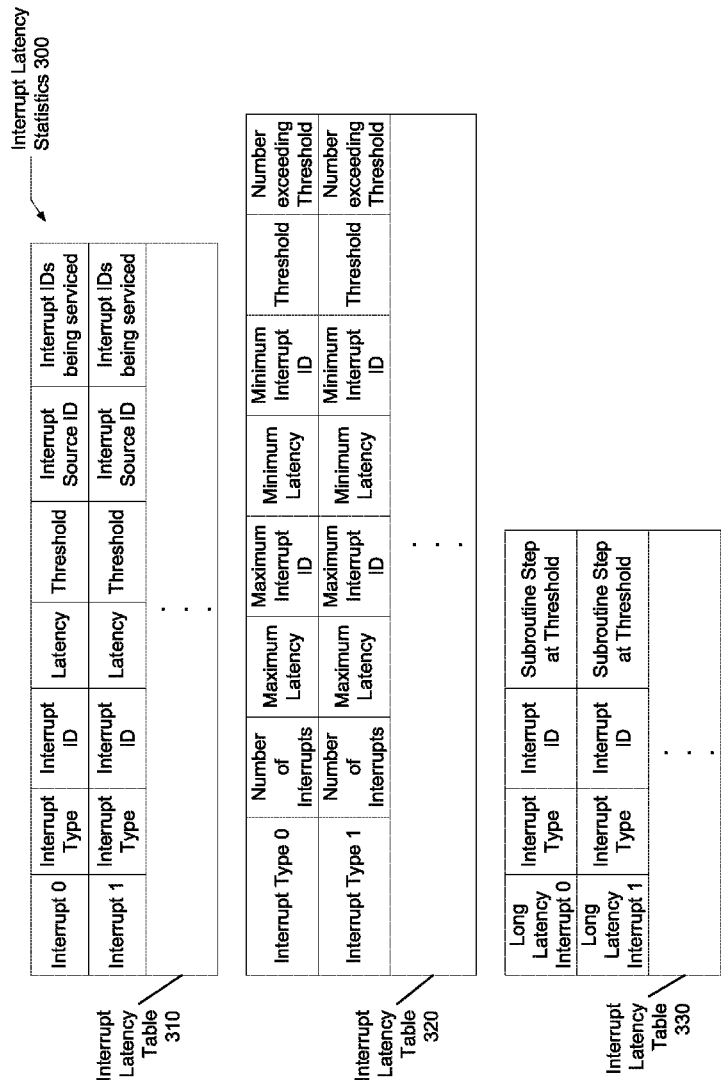
FIG. 3 is a generalized block diagram of one embodiment of interrupt latency statistics.

Turning now to FIG. 3, a generalized block diagram of one embodiment of interrupt latency statistics 300 is shown. The tables 310-330 store measured and computed information for interrupts processed during program execution of one or more software applications. As shown, each entry of the interrupt latency table 310 stores an indication of an order of being received, a type of interrupt, an identifier (ID) for the received interrupt, the measured latency, an associated threshold, an ID of a source of the received interrupt, and one or more IDs of interrupts that were simultaneously serviced. Some values may not be stored in the table 310, such as the threshold, since it may be accessed from another location. In some embodiments, the entries of the table 310 may be deallocated when they are read out in order to save on-die real estate.

The table 320 may organize latency statistics by interrupt type. For a given interrupt type, each entry of the table 320 may store a total number of interrupts serviced in a given time period, both a maximum and a minimum measured latency for the given type, IDs of the interrupts that produced the maximum and minimum latencies, an associated threshold, and a number of interrupts that exceeded the threshold.

The table 330 may organize statistics associated with latencies that exceed thresholds. Each entry of the table 330 may store an interrupt type, an interrupt ID, and an indication of a step of an associated interrupt service routine being processed at the time the threshold is exceeded. Due to data transfer back and forth between the processor and the I/O controller, the indication may not be the exact step within the interrupt service routine at the time the threshold is exceeded. Other information associated with the latencies stored in the table 330 may be found by indexing the tables 310 and 320.

Figure 4:
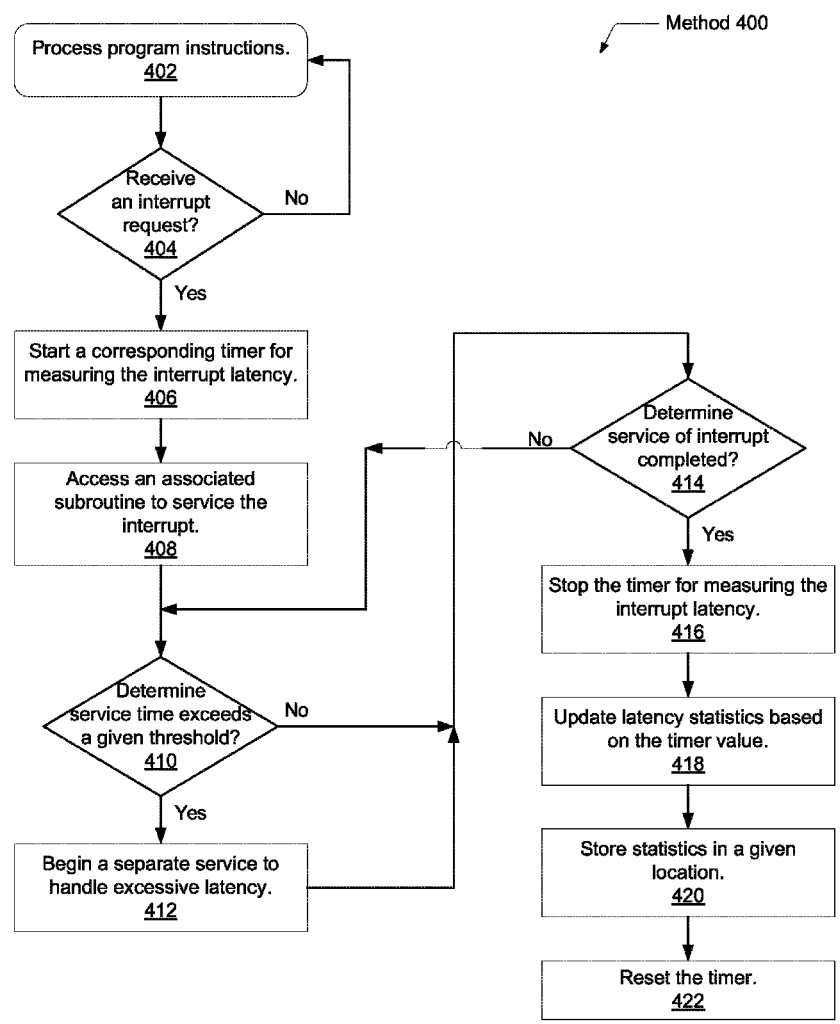
FIG. 4 is a generalized flow diagram of one embodiment of a method for monitoring interrupt latencies during real-time computing.

Referring now to FIG. 4, a generalized flow diagram of one embodiment of a method 400 for monitoring interrupt latencies during real-time computing is illustrated. The components embodied in the computing system described above may generally operate in accordance with method 400. For purposes of discussion, the steps in this embodiment are shown in sequential order. However, some steps may occur in a different order than shown, some steps may be performed concurrently, some steps may be combined with other steps, and some steps may be absent in another embodiment.

In block 402, program instructions for one or more software applications may be loaded, decoded and executed. Interrupts may be generated during the execution of the programs. If a given I/O controller receives an interrupt request (conditional block 404), then in block 406, a corresponding timer for measuring the interrupt latency may start. The timer may start when the interrupt request is received, when it is issued, or when an acknowledgment from a processor executing an associated interrupt service routine is received.

In block 408, an associated interrupt service request is accessed if it hasn't been already by the processor. The routine executes the steps for the interrupt service. If the time to process the interrupt exceeds a given threshold (conditional block 410), then in block 412, a separate service routine to handle the excessive latency may be accessed and executed. An indication may be sent from the I/O controller to the processor when the threshold is exceeded. If the service of the interrupt completes (conditional block 414), then in block 416, the timer for measuring the interrupt latency may stop. The interrupt service routine may send an indication to the I/O controller to indicate the routine has completed.

In block 418, the I/O controller may update latency statistics based on the timer value. One or more tables may be updated. In block 420, the I/O controller may store statistics in a given location, such as a given shared memory location, a trace capture buffer, and so forth. In block 422, the timer may be reset after the latency has been stored. The measured and stored values may allow software and hardware to observe real-time interrupt latencies in a running system and take programmable action when necessary, such as for long latencies. Observing real-time interrupt latencies in a running system may aid locating the causes of latency-related problems. Identifiable issues may be fixed or mitigated in software, firmware, hardware or some combination.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LP-DDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Additionally, program instructions may comprise behavioral-level description or register-transfer level (RTL) descriptions of the hardware functionality in a high level programming language such as C, or a design language (HDL) such as Verilog, VHDL, or database format such as GDS II stream format (GDSII). In some cases the description may be read by a synthesis tool, which may synthesize the description to produce a netlist comprising a list of gates from a synthesis library. The netlist comprises a set of gates, which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. Alternatively, the instructions on the computer accessible storage medium may be the netlist (with or without the synthesis library) or the data set, as desired. Additionally, the instructions may be utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
   an interrupt latency table comprising a plurality of entries, each of said entries being configured to store information for an interrupt processed during program execution of one or more software applications; and
   an input/output (I/O) controller (IOC) comprising a plurality of interfaces;
   wherein the IOC is configured to:
   measure a latency for servicing a received interrupt request from one of the plurality of interfaces;
   store an identification of the received interrupt request in an entry of the table;
   store the measured latency in said entry of the table;
   store an indication of a step of a subroutine being used to service the received interrupt request at a time that an associated latency threshold is exceeded; and
   output the measured latency, in response to receiving a read access request for the measured latency.

2. The computing system as recited in claim 1, wherein the IOC is further configured to send an indication of a long latency, in response to determining the measured latency is greater than an associated threshold.

3. The computing system as recited in claim 2, wherein the IOC is further configured to send said indication at a time the associated threshold is exceeded.

4. The computing system as recited in claim 1, wherein said indication begins a separate subroutine from the subroutine servicing the received interrupt request, wherein the separate subroutine is configured to reduce a time required to service the received interrupt request.

5. The computing system as recited in claim 2, wherein the IOC is further configured to determine values based on stored latencies including at least one of the following: maximum/minimum latencies, interrupt types, and a number of interrupts exceeding associated thresholds.

6. The computing system as recited in claim 2, wherein the IOC is further configured to store at least one of the following associated information with the measured latency: an interrupt type, an identifier of a source of the received interrupt, and identifiers of other interrupts currently being serviced.

7. The computing system as recited in claim 6, wherein the computing system further comprises one or more processing nodes connected to a plurality of I/O devices via the plurality of interfaces, wherein the IOC is further configured to store the measured latency and associated information in software visible locations.

8. A method comprising:
maintaining in non-transitory computer accessible storage medium an interrupt latency table comprising a plurality of entries, each of said entries being configured to store information for an interrupt processed during program execution of one or more software applications;
measuring a latency for servicing a received interrupt request;
storing an identification of the received interrupt request in an entry of the table;
storing the measured latency in said entry of the table;
storing an indication of a step of a subroutine being used to service the received interrupt request at a time that an associated latency threshold is exceeded; and
outputting the measured latency, in response to receiving a read access request for the measured latency.

9. The method as recited in claim 8, further comprising sending an indication of a long latency, in response to determining the measured latency is greater than an associated threshold.

10. The method as recited in claim 9, further comprising sending said indication at a time the associated threshold is exceeded.

11. The method as recited in claim 8, wherein said indication begins a separate subroutine from the subroutine servicing the received interrupt request, wherein the separate subroutine is configured to reduce a time required to service the received request.

12. The method as recited in claim 9, further comprising determining values based on stored latencies including at least one of the following: maximum/minimum latencies, interrupt types, and a number of interrupts exceeding associated thresholds.

13. The method as recited in claim 9, further comprising storing at least one of the following associated information with the measured latency: an interrupt type, an identifier of a source of a received interrupt, and identifiers of other interrupts currently being serviced.

14. The method as recited in claim 13, wherein the interrupt request is from a processing node or an input/output (I/O) device, the method further comprising storing the measured latency and associated information in software visible locations.

15. An interrupt controller comprising:
an interrupt latency table comprising a plurality of entries, each of said entries being configured to store information for an interrupt processed during program execution of one or more software applications; and
an interface for receiving interrupt requests;
control logic; and
monitoring logic;
wherein the control logic is configured to:
prioritize interrupt requests received from the interface; and
send an indication to begin an interrupt service routine corresponding to a highest priority interrupt request; and
wherein the monitoring logic is configured to:
measure a latency for servicing the highest priority interrupt request;
store an identification of the received interrupt request in an entry of the table;
store the measured latency in said entry of the table;
store an indication of a step of a subroutine being used to service the received interrupt request at a time that an associated latency threshold is exceeded; and
output the measured latency, in response to receiving a read access request for the measured latency.

16. The interrupt controller as recited in claim 15, wherein the monitoring logic is further configured to send an indication, in response to determining the measured latency is greater than an associated threshold.

17. The interrupt controller as recited in claim 16, wherein the monitoring logic is further configured to determine values based on stored latencies including at least one of the following: maximum/minimum latencies, interrupt type, and a number of interrupts exceeding associated thresholds.

18. The interrupt controller as recited in claim 16, wherein the monitoring logic is further configured to store at least one of the following associated information with the measured latency: an interrupt type, an identifier of a source of the received interrupt, and identifiers of other interrupts currently being serviced.

* * * * *